United States Patent [19]

Moberg

[11] Patent Number: 5,010,282

[45] Date of Patent: Apr. 23, 1991

[54] METHOD AND APPARATUS FOR DRIVING A DC MOTOR

[75] Inventor: Gregory O. Moberg, Rochester, N.Y.

[73] Assignee: Eastman Kodak Company, Rochester, N.Y.

[21] Appl. No.: 350,870

[22] Filed: May 11, 1989

[51] Int. Cl.$^5$ .............................................. H02P 6/02
[52] U.S. Cl. ........................................ 318/254; 318/696; 318/138
[58] Field of Search ................................ 318/254, 134

[56] References Cited

U.S. PATENT DOCUMENTS

| | | | |
|---|---|---|---|
| 4,370,065 | 1/1983 | Kawamura et al. | 368/157 |
| 4,522,507 | 6/1985 | Kawamura et al. | 368/157 |
| 4,595,865 | 6/1986 | Jahns | 318/254 |
| 4,599,005 | 7/1986 | Kawamura et al. | 368/157 |
| 4,715,725 | 12/1987 | Kawamura et al. | 368/157 |
| 4,777,579 | 10/1988 | Jahns et al. | 363/98 |

*Primary Examiner*—Bernard Roskoski
*Attorney, Agent, or Firm*—Parkhurst, Wendel & Rossi

[57] ABSTRACT

A high efficiency remote current sensing motor drive circuit is disclosed, wherein the use of a sense resistor to sense motor current is eliminated to improve the overall efficiency of the motor drive circuit. The disclosed motor drive circuit is based on the principle that the drain-to-source voltage of a power FET in a motor phase driver can be detected and used to generate a feedback current that is proportional to the detected drain-to-source voltage and inversely proportional to a drain-to-source resistance of a reference FET that is much smaller than the power FET.

12 Claims, 6 Drawing Sheets

NOTE: Hn=1 IF VOLTAGE AT HALL EFFECT COMPARATOR INPUT OF Hn+ > VOLTAGE AT Hn-.

"FORWARD" COMMUTATION SEQUENCE M2, M1 = 10

"REVERSE" COMMUTATION SEQUENCE M2, M1 = 01

⎍⎍⎍⎍ = PWM (PULSE WIDTH MODULATION)

⎍___⎍ = SINK (N-CHANNEL FET ON)

(OC) = DISABLE (N- & P-CHANNEL FET OPEN CIRCUIT)

5,010,282

METHOD AND APPARATUS FOR DRIVING A DC MOTOR

BACKGROUND OF THE INVENTION

The present invention relates to an electronic motor drive circuit for a brushless DC motor. In particular, the present invention is directed to an electronic motor drive circuit in which current sensing efficiency is improved by eliminating the use of a current sense resistor to sense motor current.

Efforts have been made to provide an electronic drive circuit for a brushless DC motor having a reduced power dissipation as compared to linear operation, by operating a set of pass transistors in a saturated switching mode and utilizing a "flyback" effect to sustain a relatively constant motor current. An example of such a drive circuit is illustrated in FIG. 1. A set of motor windings $W_1$, $W_2$ and $W_3$ are interconnected between a first set of FET transistors P1, P2, and P3, and a second set of FET transistors N1, N2 and N3 in a bridge circuit. The transistors are operated as saturated switches, thereby dropping the operating voltage principally across the motor inductance rather than across the transistors or winding resistance.

The commutation logic 10 establishes a current path through a selected first transistor (P1, P2 or P3), a pair of windings (W1, W2 and/or W3), and a selected second transistor (N1, N2 or N3). For example, an established current path through transistor P1, windings Q1 and Q2, and transistor N2 is shown in FIG. 2. A current sensing resistor 12 is also provided to sense the motor current. A comparator 14 triggers a one-shot circuit 16 when the voltage across the resistor 12 reaches a predetermined threshold voltage. The output signal from the one-shot 16 is provided to the commutation circuit 10, which then switches off the transistor P1 thereby blocking current flow through the transistor.

The load voltage across the motor inductance then reverses polarity as the field begins to collapse, thus reversing the polarity of the voltage across the transistor N2. A current path is then established through the body diode of another of the second transistors, for example N1, and the load current that was flowing through the transistor P1 thereafter flows through the series-connected second transistor N1 (alternatively, transistor N1 can be switched on to provide a current path). FIG. 3 illustrates the current path through the second transistor N1 after the transistor P1 has been switched off. As the load voltage has been reversed, the load current decreases until the one-shot 16 reverts to its original state. Thus, the load current through the motor windings is stabilized within predetermined limits while power dissipation is reduced by operating the transistors as saturated switches.

The above described motor control circuit fails to achieve maximum efficiency, however, due to the power loss across the sense resistor 12. Thus, it would be desirable to develop a motor driver circuit wherein the current sense resistor is eliminated to improve the efficiency of the circuit.

SUMMARY OF THE INVENTION

The present invention provides a high efficiency remote current sensing motor drive circuit wherein the use of a sense resistor to sense motor current is eliminated, thereby improving the overall efficiency of the motor drive circuit. The present invention is based on the principle that the drain-to-source voltage of a power FET in a motor phase driver can be detected and used to generate a feedback current that is proportional to the detected drain-to-source voltage and inversely proportional to a drain-to-source resistance of a reference FET that is much smaller than the power FET.

In accordance with a preferred embodiment of the invention, a motor drive circuit is provided that includes a driver circuit for applying a phase current to coils of a DC motor in accordance with a commutation sequence, the driver circuit includes a plurality of current sink transistors, each current sink transistor corresponding to one of the coils of said DC motor, a sensing circuit for sensing the drain-to-source voltage of said driver sink transistors when an ON voltage is applied to the gates of the driver sink transistors by the driver circuits, and a circuit for generating a feedback current, which is proportional to the drain-to-source voltage sensed by the sensing circuit and inversely proportional to a drain-to-source resistance of a reference transistor, and controlling the operating current level of the motor drive circuit based on the feedback current.

BRIEF DESCRIPTION OF THE DRAWINGS

The above discussion of the background of the invention and the following discussion of the preferred embodiment of the present invention should be viewed with reference to the following figures in which:

FIG. 7b is a current loop timing diagram for the circuit illustrated in FIG. 7a.

DETAILED DESCRIPTION OF THE PREFERRED EMBODIMENT

Figure 1:
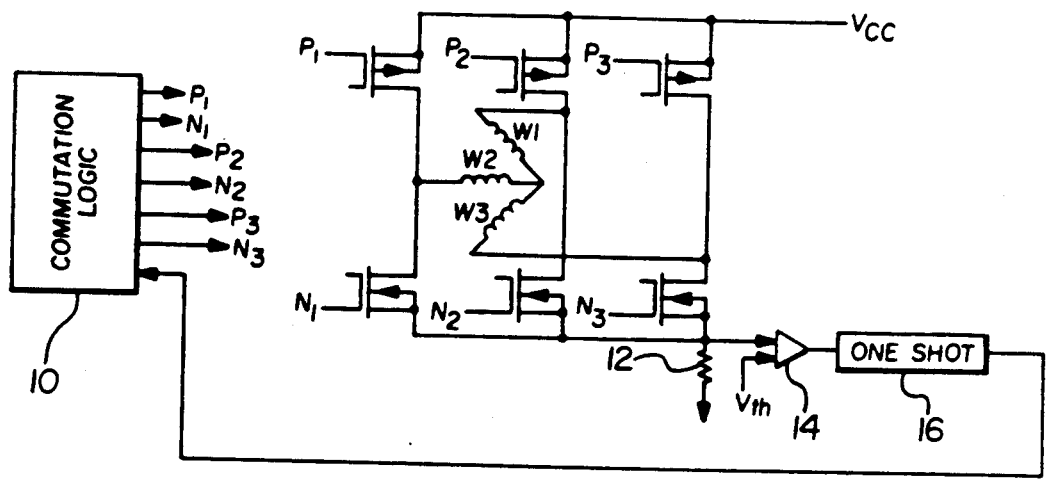
FIG. 1 illustrates a motor drive circuit employing a current sense resistor.
Figure 2:
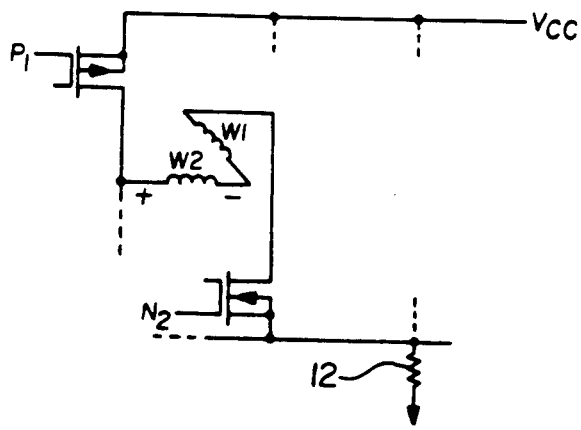
FIG. 2 illustrates a current path established in the circuit of FIG. 1.
Figure 3:
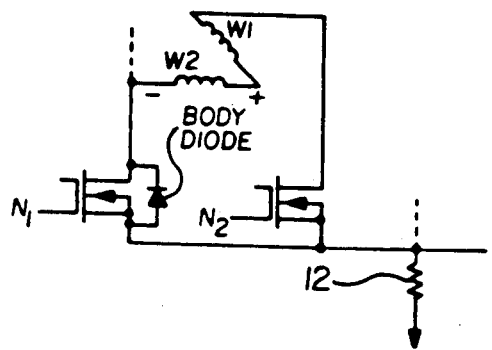
FIG. 3 illustrates a current path established in the circuit of FIG. 1.
Figure 4:
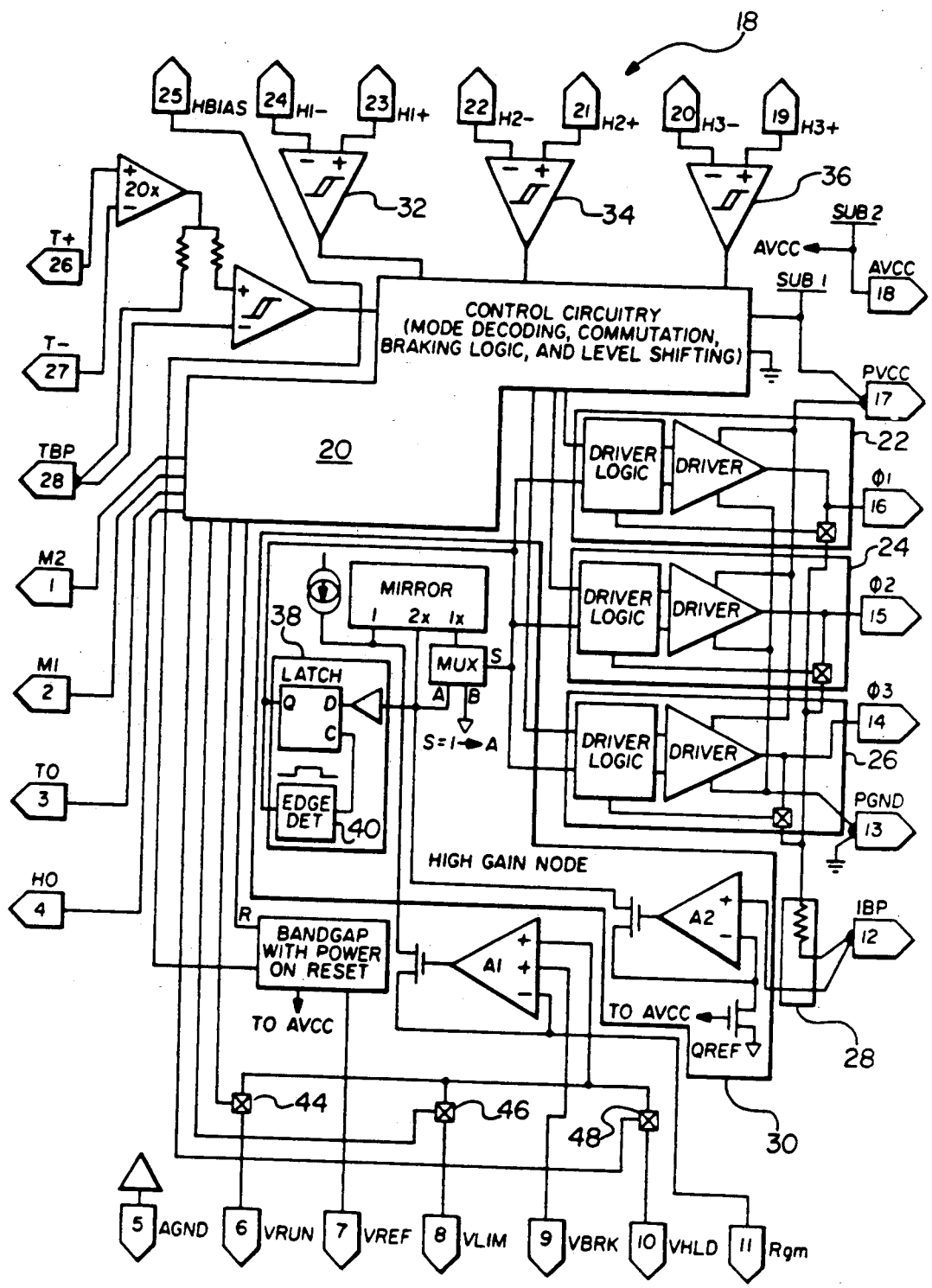
FIG. 4 illustrates a motor control circuit according to the present invention.
Figure 7A:
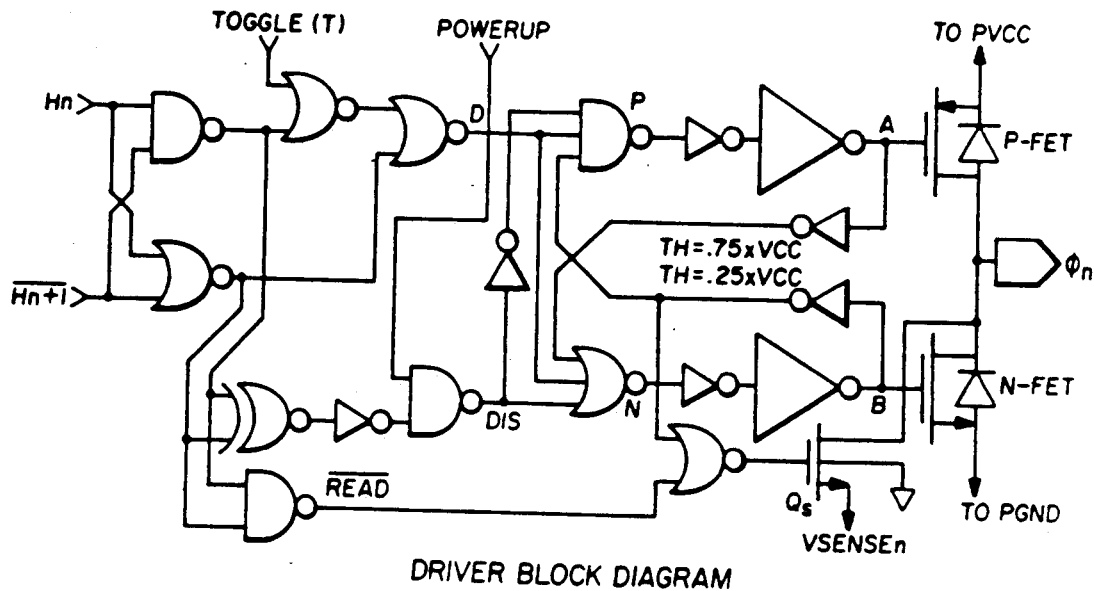
FIG. 7a is a block diagram of the phase drive circuit employed in the motor control circuit illustrated in FIG. 4.
Figure 7B:
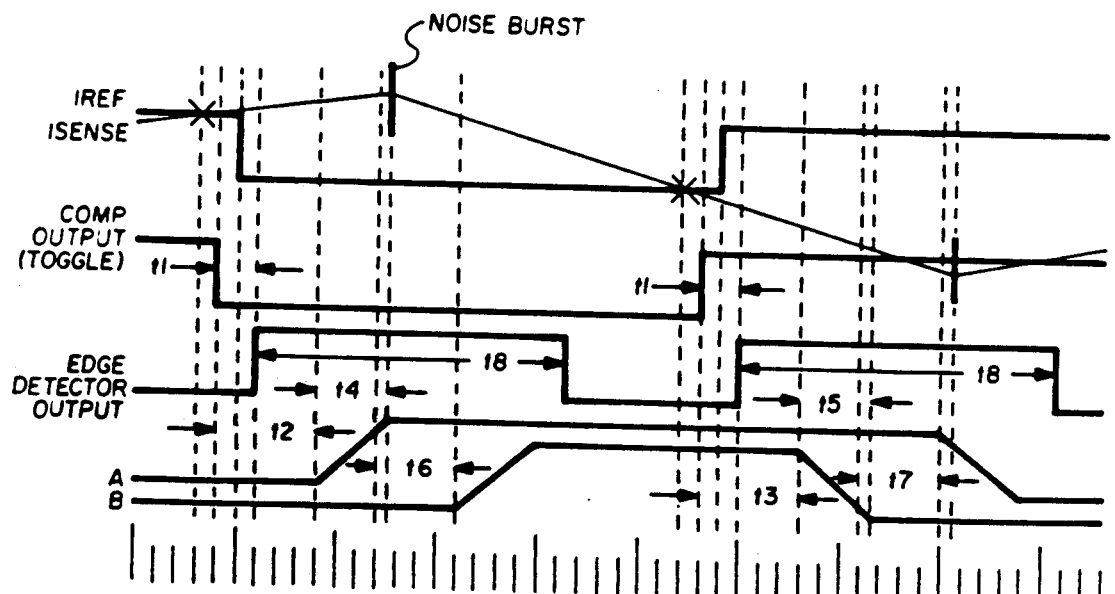

Referring now to FIG. 4, a diagram of a motor control circuit 18, preferably incorporated as a single integrated circuit, is shown including control circuitry 20, phase driver circuits 22-26 coupled to the coils of a DC motor (not shown) via phase outputs Φ1, Φ2 and Φ3, filter circuit 28 (including an external capacitor not shown), and a transconductance comparator circuit 30. A more detailed block diagram of the phase driver circuits 22-26 is provided in FIG. 7a along with its associated current loop timing diagram in FIG. 7b.

Figure 8:
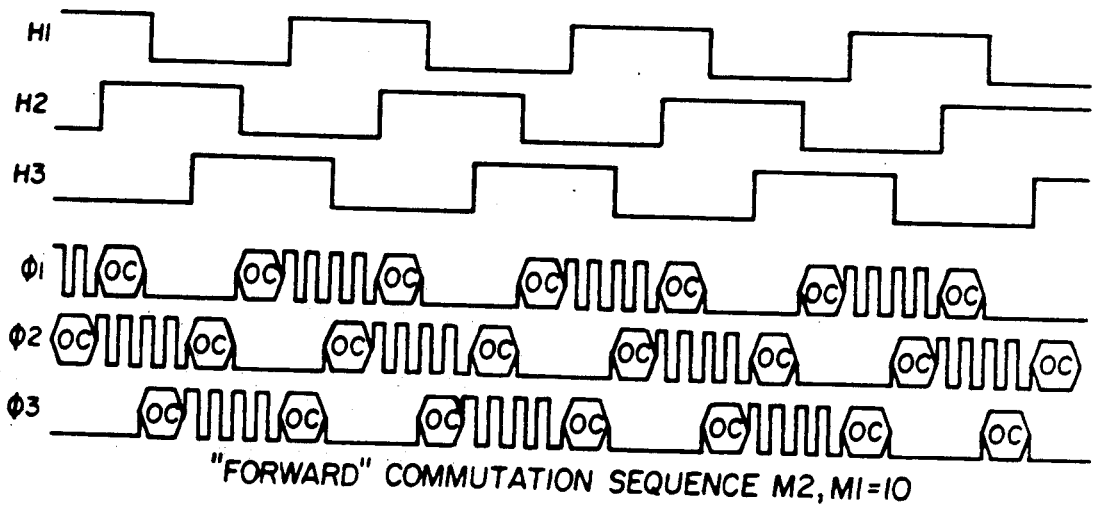
FIG. 8 is a commutation state table for the motor control circuit illustrated in FIG. 4.
Figure 8:
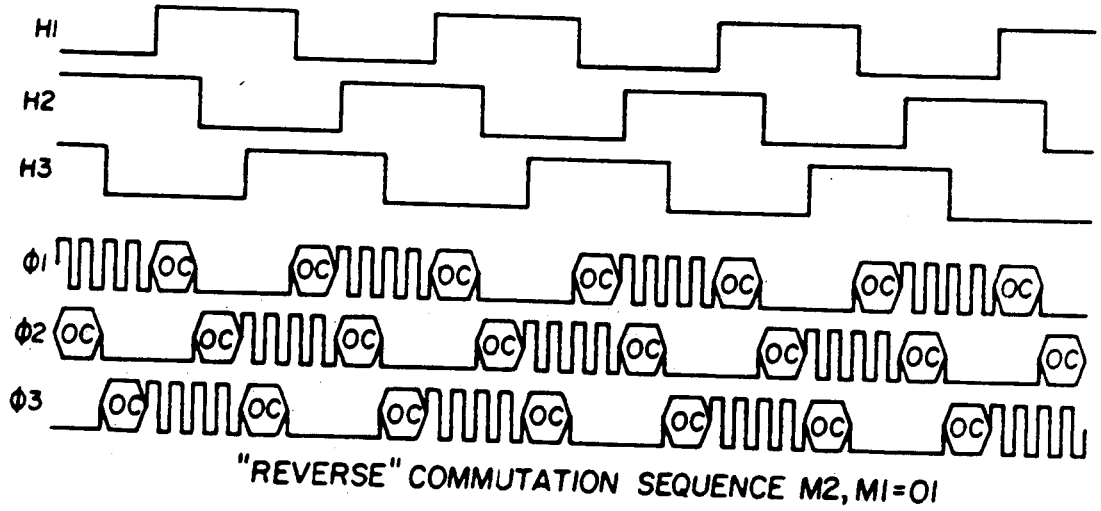

The control circuitry 20 includes mode decoding, commutation and braking logic circuits which will be discussed in greater detail below. Input signals from Hall effect sensors (not shown), which are used to detect the rotational phase of the DC motor, are coupled to the control circuitry 20 via Hall effect comparators 32-36, as well as tachometer inputs signals (T+, T−). The control circuitry 20 can be coupled to a controller, such as a microprocessor, to receive a mode control word via inputs M1 and M2 from the microprocessor and to transmit a tachometer output signal and a Hall effect output signal to the controller. A commutation state table is illustrated in FIG. 8 illustrating forward and reverse commutation sequences.

The transconducting comparator circuit 30 includes a noise lockout latch 38 including an edge detector 40 and latch 42, an amplifier A2 coupled to the filter circuit 28 and a reference transistor QREF. The transconducting comparator circuit 30 is also coupled to a three input transconductance amplifier A1. The transconductance amplifier A1 is configured as a unity gain buffer, with one input connected to an external resistor Rgm, one input connected to a voltage VLIM and the third input selectively coupled to either a running voltage VRUN, a braking voltage VBRK or a holding voltage VHOLD. The selection of which voltage is to be applied to the third input to the transconductance amplifier A1 is controlled by the control circuit 20 via gates 44-46, in accordance with the mode selection word received from the controller.

Figure 5:
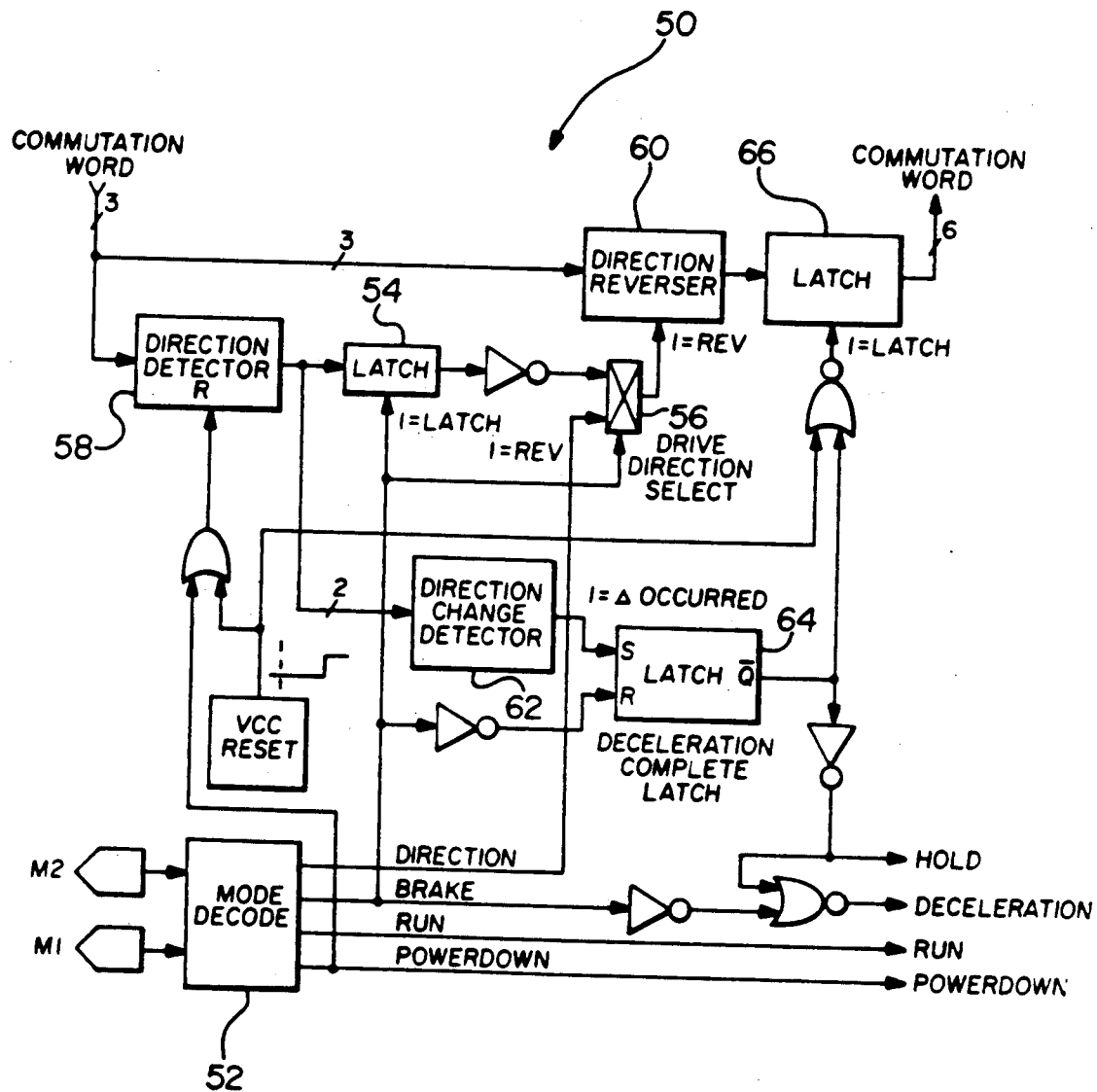
FIG. 5 illustrates mode control and braking logic circuits employed in the motor control circuit illustrated in FIG. 4.

FIG. 5 illustrates the mode control and optimum braking logic 50 incorporated in the control circuitry 30. As previously discussed, the operating mode is controlled by a two bit mode selection word (M1, M2) received from an external controller such as a microprocessor. The two bit mode selection word permits four operating modes: powerdown, forward, reverse, and brake/hold.

In either the forward or reverse modes, the mode decode circuit 52 outputs a signal to the direction detector latch 54 which causes it to accept direction information from the mode decoder 52. This signal also is provided to a drive direction selector 56, and torque is then applied to the motor in the direction determined by the input word. During the time that the circuit is in either the forward or reverse modes, a direction detector 58 (an array of D flip-flops) monitors the rotational direction of the motor (not the torque direction). When the input word is changed to command the brake mode, the inverse of the drive direction detector output signal is applied to the direction reverser circuit 60, so that the torque applied to the motor is opposite to its rotational direction. The motor therefore decelerates and eventually changes direction. The change in direction is detected by the direction change detector 62, the output signal of which is held in a deceleration complete latch 64. When the output signal of the deceleration complete latch 64 indicates completed deceleration, the latch 66 in the commutation word bus "freezes" the then-present commutation word to hold the motor at the position it was in when the rotational direction reversed.

In the powerdown mode, the analog sections of the circuit are powered down completely. Thus, only leakage current is drawn in the powerdown mode to conserve power.

In order to eliminate certain fault modes which could occur when changing into the brake mode from either powerdown or application of VCC, the powerdown and power on reset signal (which occurs whenever the reference voltage power ups) are applied to the direction detector 56. The power on reset forces the output of the direction detector 56 to indicate a direction reversal, and maintains the commutation word latch in a track mode. This allows the Hall effect comparator outputs to settle to a valid output before the commutation word latch enters the latch mode.

Figure 6:
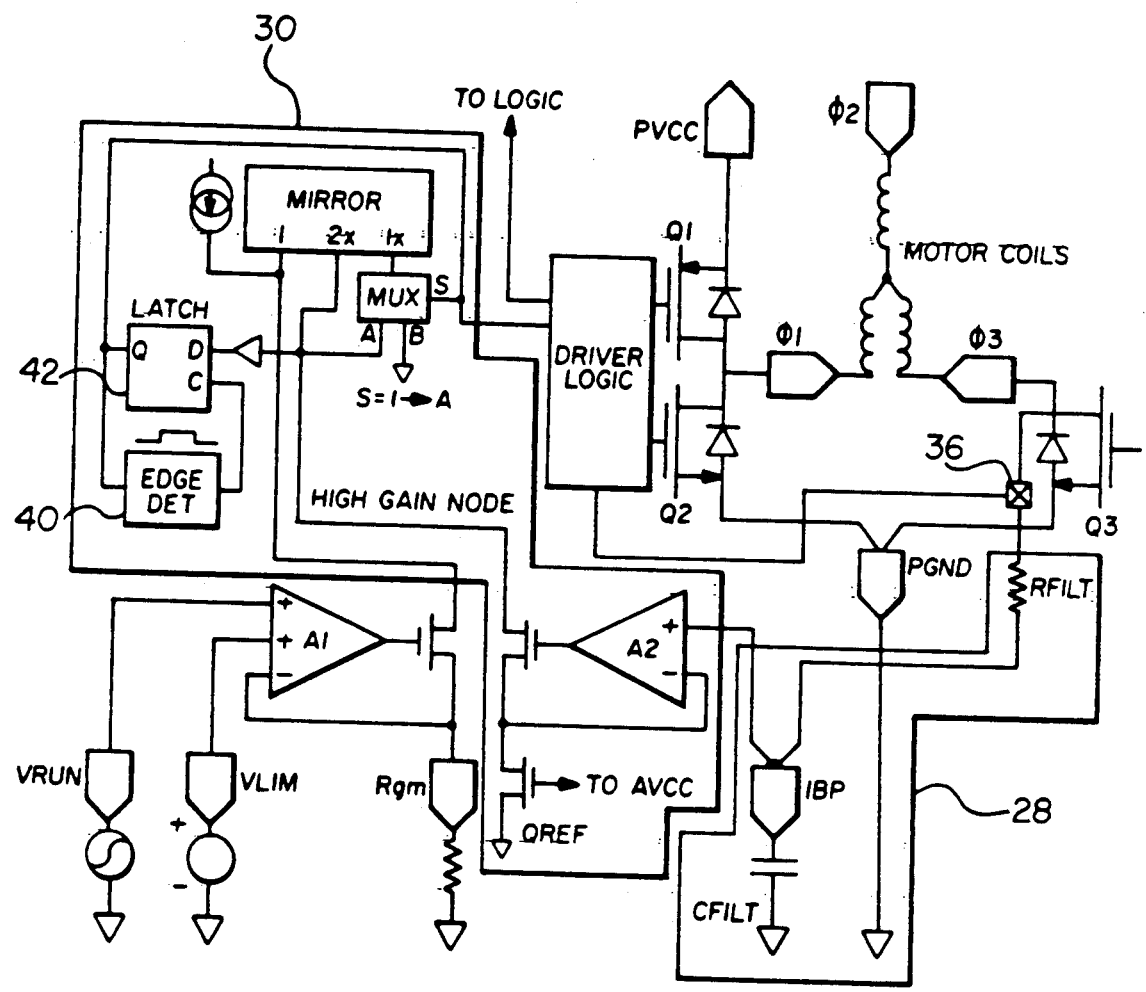
FIG. 6 illustrates a single phase drive circuit employed in the motor control circuit of FIG. 4 connected to motor windings.

The operation of the motor control circuit 18 will be discussed in greater detail with reference to FIG. 6 which illustrates a single driver circuit connected to the motor coil windings. During the operation of motor phases Φ1 and Φ3, transistors Q1 and Q2 form a pulse-width-modulation (PWM) pair. Transistor Q3 is continually ON and the drain-to-source resistance (Rds) is utilized as a current monitoring resistance. Transistor Q3 is selected as a current monitor via a transmission gate 36 connected to the drain of transistor Q3.

During operation, current flows from the power connection AVCC through transistor Q1, the windings of the motor, transistor Q3 and to the ground connection GND. The current increases inductively as a voltage equal to AVCC-VMOT is applied across the motor inductance (VMOT=Motor back EMF+IR). As the current flows, a voltage appears across Rds of transistor Q3. This voltage is filtered through the filter circuit 28, consisting of a resistor RFILT and capacitor CFILT, to eliminate voltage spikes. Amplifier A2 is connected to the filter circuit 28 and generates a feedback current IFB. Similarly, a reference current is generated by amplifier A1 based on the applied voltage VRUN divided by an external resistance Rgm (i.e., IREF=-VRUN/Rgm).

When the transconductance comparator circuit 30 detects that IFB exceeds IREF, the high gain node of the comparator circuit 30 switches LOW which reduces IREF by a fixed percentage, for example 33% (the actual percentage chosen is a design tradeoff between the percentage of ripple versus frequency). Transistor Q1 is turned OFF and transistor Q2 is turned ON, after a predetermined time delay to prevent simultaneous conduction of two transistors. When transistor Q2 is turned ON, the current in the motor coils decreases inductively, as the voltage applied to the motor coils is now negative of the back EMF+IR. The high gain node switches HIGH when the current through QREF (which is proportional to I(Q3)) decreases to the reduced level of the current IREF. Current IREF returns to full value when the node switches high, transistor Q2 is turned OFF and transistor Q1 is turned ON (after an appropriate delay), and this oscillation repeats with its amplitude determined by the values of currents IREF and IFB.

The edge detector 40 is used to detect when a change in state occurs. The output pulse from the edge detector 40 is supplied to the latch 42 to latch the transconductance comparator in its existing state for a time exceeding the propagation delay from the comparator output to the output of amplifier A2, thereby preventing noise spikes from falsely triggering the comparator.

The Rds ON of transistor QREF is used to generate the reference current for the comparator order to make the minimum and maximum motor currents be independent of temperatures and IC process parameters, the transistor QREF is sized so that it has a small fraction of the number of cells as Q3, for example, 1/1000. Thus, as transistor QREF is enhanced to the same gate voltage as transistor Q3, a current of 1/1000th the current in transistor Q3 will produce the same drain-to-source voltage Vds. The much smaller reference current through QREF therefore controls the large phase current in transistor Q3.

As stated above, the reference current IREF is generated by the three input operational amplifier A1 and an external resistor Rgm. The op-amp A1 is connected as a unity gain buffer such that VIN is copied onto Rgm. The reference current IREF is therefore equal to $3\times$VIN/Rgm or $2\times$VIN/Rgm, depending on the comparator state. The VIN and VLIM inputs are preferably emitter coupled PNP transistors, so that the lower of the two voltages controls the op-amp A1. Thus, a DC voltage applied to VLIM input will act as a current limit.

The above described circuit forces the maximum and minimum phase currents to be proportional to the drive voltage, independent of the supply voltage. The control function is therefore a transconductance, with its value being set by one external resistor Rgm. The phase current is sensed across the driver sink transistor ON voltage to eliminate the current sense resistor. Thus, maximum efficiency is obtained by eliminating the loss associated with conventional current sense resistors.

The invention has been described with reference to certain preferred embodiments thereof. The invention, however, is not limited to the specific embodiment shown and variations and modifications can be effected within the spirit and scope of the invention as expressed in the claims. For example, other methods—including constant frequency control, constant on-time control and constant off-time control—may be used to control the operating current based on the feedback current.

What is claimed is:

1. A control circuit for a DC motor, said control circuit comprising:
   a. driver means for applying a phase current to coils of a DC motor in accordance with a commutation sequence, said driver means including a plurality of FET current sink transistors, each transistors, each current sink transistor corresponding to one of said coils of said DC motor;
   b. sensing means for sensing a drain-to-source voltage of one of said current sink transistors when an ON gate voltage is applied thereto by said driver means and applying said drain-to-source voltage across a drain and source of an FET reference transistor;
   c. means for supplying said ON gate voltage to a gate of said FET reference transistor thereby inducing a reference current to flow through said FET reference transistor that is proportional to a current flowing through said current sink transistor that has said ON gate voltage applied thereto; and
   d. means for generating a feedback current based on said reference current that is proportional to the drain-to-source voltage sensed by said sensing means and inversely proportional to a drain-to-source resistance of said FET reference transistor;
   e. comparing means for comparing said feedback current to a secondary reference current and controlling an operating current level of said DC motor in response thereto.

2. A control circuit for a DC motor as claimed in claim 1, further comprising means for selecting the value of said secondary reference current.

3. A control circuit for a DC motor as claimed in claim 1, wherein said comparing means includes means for reducing said secondary reference current by a predetermined percentage when said feedback current exceeds said secondary reference current and for returning said secondary reference current to normal when said reference current decreases to said secondary reference current.

4. A control circuit for a DC motor as claimed in claim 1, wherein said FET reference transistor is sized so that it has a small fraction of the number of cells as said current sink transistor.

5. A control circuit for a DC motor as claimed in claim 4, wherein said FET reference transistor has 1/1000 the cell size as said current sink transistor.

6. A control circuit for a DC motor, said control circuit comprising:
   a. a plurality of phase driver circuits, each phase driver circuit including an FET current sink transistor;
   b. control circuitry coupled to said plurality of phase driver circuits to drive said phase driver circuits in accordance with a commutation sequence;
   c. a comparator circuit coupled to said phase driver circuits, said comparator circuit including a first amplifier having a first input coupled to a FET reference transistor and a second input selectively coupled to one of aid current sink transistors of said phase driver circuits such that a drain-to-source voltage of said one current sink transistor is applied to said reference transistor;
   d. means for applying an ON gate voltage to said current sink transistor that is selectively coupled to said second input and to said reference transistor wherein a first reference current is induced in said reference transistor that is proportional to a sink current flowing through said current sink transistor that is selectively coupled to said second input and said comparator circuit generates a feedback current based on said first reference current that is proportional to the drain-to-source voltage of the current sink transistor and inversely proportional to the drain-to-source resistance of said reference transistor, and
   e. a second amplifier coupled selectively coupled to at least one input voltage source, a second gain setting resistor, and said comparator circuit, said second amplifier generating a second reference current that is supplied to said comparator circuit wherein said comparator circuit compares said feedback current to said second reference current and the operating current of the DC motor is controlled in response thereto.

7. A control circuit for a DC motor as claimed in claim 6, wherein said FET reference transistor is sized so that it has a small fraction of the number of cells as said current sink transistor.

8. A control circuit for a DC motor as claimed in claim 6, wherein said FET reference transistor has 1/1000 the cell size as said current sink transistor.

9. A control circuit for a DC motor as claimed in claim 6, wherein said transconducting comparator circuit includes a noise lockout latch.

10. A control circuit for a DC motor as claimed in claim 9, further comprising a filter circuit coupled between said second input to said first amplifier and said phase driver circuits.

11. A method of controlling a DC motor comprising:
   a. applying a phase current to coils of said DC motor in accordance with a commutation sequence with a plurality of phase driver circuits, wherein each of said phase driver circuits includes said FET current sink transistor corresponding to one of said coils of said DC motor;

b. applying an ON voltage to the gate of one of said current sink transistors;
c. sensing the drain-to-source voltage of the sink transistor to which said ON voltage was applied with a sensing unit;
d. applying said drain-to-source voltage across a drain and source of a reference transistor and said ON voltage to a gate of said reference transistor, thereby inducing a reference current in said reference transistor that is proportional to a sink current flowing through the sink transistor to which said ON voltage was applied;
e. generating a feedback current base on said reference current that is proportional to the sensed drain-to-source resistance of a reference transistor;
f. comparing said feedback current to an external reference current; and
g. controlling an operating current level of said DC motor in response to the comparison of said feedback current to said external reference current with a control circuit.

12. A method of controlling a DC motor as claimed in claim 11, wherein said step of controlling the operating current level of said DC motor comprises reducing said secondary reference current by a predetermined percentage when said feedback current exceeds said secondary reference current and returning said secondary reference current to normal when said reference current decreases to said secondary reference current.

* * * * *